US009578501B2

(12) United States Patent
Barker

(10) Patent No.: US 9,578,501 B2
(45) Date of Patent: *Feb. 21, 2017

(54) COMMUNICATIONS METHOD

(71) Applicant: Nomad Spectrum Limited, Newcastle Upon Tyne (GB)

(72) Inventor: Nick Barker, Durham (GB)

(73) Assignee: Nomad Spectrum Limited, New Castle Upon Tyne (GB)

( * ) Notice: Subject to any disclaimer, the term of this patent is extended or adjusted under 35 U.S.C. 154(b) by 65 days.

This patent is subject to a terminal disclaimer.

(21) Appl. No.: 14/182,701

(22) Filed: Feb. 18, 2014

(65) Prior Publication Data
US 2014/0245003 A1    Aug. 28, 2014

(30) Foreign Application Priority Data

Feb. 27, 2013 (GB) .................................. 1303430.1

(51) Int. Cl.
*H04L 29/06* (2006.01)
*H04W 12/06* (2009.01)
(Continued)

(52) U.S. Cl.
CPC .............. *H04W 12/06* (2013.01); *H04L 63/08* (2013.01); *H04W 4/003* (2013.01); *H04W 8/205* (2013.01); *H04W 48/16* (2013.01); *H04W 84/005* (2013.01)

(58) Field of Classification Search
CPC .... H04W 12/06; H04W 84/005; H04W 48/16; H04W 48/20; H04W 76/02; H04L 63/08; H04L 12/281; H04L 67/16; H04L 67/141; H04L 67/14; H04L 69/24; H04L 69/18; H04L 65/605; H04L 67/2838; H04L 65/1043; H04L 65/60; H04L 69/16
(Continued)

(56) References Cited

U.S. PATENT DOCUMENTS 7,069,587 B2 *  6/2006  Ito .......................... G06F 21/35
                                                           713/183
7,716,483 B2 *  5/2010  Sozzani ................ H04L 9/0822
                                                           380/277
(Continued)

FOREIGN PATENT DOCUMENTS

EP        2518977 A1    10/2012
WO    2004/082314 A2     9/2004
(Continued)

OTHER PUBLICATIONS

Extended European Search Report received for European Patent Application No. 14155322.2, mailed on Jul. 29, 2014, 8 pages.
(Continued)

*Primary Examiner* — Thanhnga B Truong
(74) *Attorney, Agent, or Firm* — Fiala & Weaver P.L.L.C.

(57) ABSTRACT

The present application relates to a method of providing connectivity to a vehicle. The method comprises, at a first device aboard the vehicle, establishing at least one first connection with at least one first network, the at least one first connection allowing communication with a second device remote from the first device, transmitting via the at least one first connection an allocation request to the second device, receiving via the at least one first connection an allocation response from the second device, the allocation response indicating a first authentication device from a plurality of authentication devices remote from the first device, and establishing a second connection with a network and authenticating the first device on the network using the first authentication device.

16 Claims, 10 Drawing Sheets

(51) Int. Cl.
*H04W 4/00* (2009.01)
*H04W 8/20* (2009.01)
*H04W 48/16* (2009.01)
*H04W 84/00* (2009.01)

(58) Field of Classification Search
USPC ........ 713/153, 155, 165, 168, 171; 709/201, 709/204, 218, 227, 228, 230, 231, 237, 709/245; 380/277–279; 370/216, 228, 370/252, 352, 464, 466; 455/410, 411
See application file for complete search history.

(56) References Cited

U.S. PATENT DOCUMENTS

| | | | |
|---|---|---|---|
| 8,171,531 B2* | 5/2012 | Buer | G06F 21/34 380/277 |
| 8,418,258 B2* | 4/2013 | Goyal | G06F 21/6209 709/217 |
| 8,856,349 B2* | 10/2014 | Jain | H04L 12/281 370/464 |
| 8,989,954 B1* | 3/2015 | Addepalli | H04W 4/046 370/328 |
| 2004/0072591 A1 | 4/2004 | Andreini | |
| 2012/0129513 A1 | 5/2012 | van der Laak | |
| 2013/0023235 A1 | 1/2013 | Fan et al. | |

FOREIGN PATENT DOCUMENTS

WO  2012/058446 A1  5/2012
WO  2012/139623 A1  10/2012

OTHER PUBLICATIONS

Search Report Received for GB Patent Application No. GB1303430.1, Date of Search: Aug. 13, 2013, 1 page.

* cited by examiner

COMMUNICATIONS METHOD

CROSS-REFERENCE TO RELATED APPLICATIONS

This application claims priority to United Kingdom Patent Application No. 1303430.1, filed on Feb. 27, 2013, the entirety of which is incorporated by reference herein.

BACKGROUND

Technical Field

The present invention relates to a method of providing connectivity to a vehicle.

Description of Related Art

With the increased portability of computers, and the increasing sophistication of mobile devices such as mobile telephones and palmtop computers, there is a growing demand for connectivity while on the move allowing, for example, connection with other devices, and the Internet. One response to this demand is based upon devices having built-in long-range telecommunications capabilities, such as devices which make use of mobile telephone networks. While such solutions can be effective, they typically suffer from problems of low bandwidth and incomplete geographic coverage. The problem of low bandwidth is a particular issue when a user wishes to access content comprising a large quantity of data (for example video content). The problem of incomplete geographic coverage is particularly problematic when a user is moving, given that data communication may be interrupted when a signal is lost (for example when a train enters a tunnel).

An alternative method of providing data connectivity to mobile devices is based upon the use of access points. Such access points may be provided, for example, in public buildings such as libraries and cafes, and can be accessed by mobile computing devices which are located within a predetermined range of the access point. One common technology used to allow mobile computing devices to connect to such access points is specified by IEEE standard 802.11, and is commonly referred to as WiFi. The use of access points in this way is advantageous in that it allows higher bandwidth connections to be established.

The limitations of systems based upon the connection of mobile devices to mobile telephone networks has led to the proposal that public transport vehicles, such as trains or buses, may be beneficially provided with wireless access points, such that mobile computing devices used by passengers traveling in the vehicle can be provided with data connectivity.

More power is available on the vehicle than on a mobile computing device, meaning that systems fitted to vehicles can generally support larger, higher gain antennas than those that are generally installed in portable user devices such as mobile telephones. Furthermore, greater computational power can be used in signal processing in a device associated with a vehicle given that there is room for larger, more powerful processing devices.

Different types of communication links can be used to provide data communication to a vehicle, separately or together, appropriate to the locations through which the vehicle travels. Furthermore, if a vehicle's route is known, the communication links can be managed to provide a higher level of service with greater bandwidth, lower latencies, and fewer losses of connection than if the communications were made directly to individual users using a mobile telephone network. It follows that the provision of a wireless access point on board a vehicle has considerable advantages. Such provision does, however, bring challenges.

It is known for vehicles to connect to base stations along a known route, for example alongside a train track. The base stations may be placed specifically for vehicles travelling along that route, or may be base stations of mobile network operators. It is further known for the vehicle to connect, via the connected base stations, to a home server. The home server may be connected to the Internet via standard means, for example via cable or via a digital subscriber line (DSL). A communication control unit is placed on the vehicle. As the vehicle travels along the route, the communication control unit wirelessly connects to a particular base station. In this way, the communication control unit can connect to the Internet through the home server, routed via the base stations and any intermediate devices in the network. The communication control unit is adapted to distribute the Internet connection to devices within the vehicle, allowing users to connect to the Internet whilst onboard the vehicle.

In order to connect to base stations provided by a mobile network operator, a Subscriber Identity Module (SIM) is required to authenticate the communication control unit with that mobile network operator. As network operators often do not have complete geographic coverage, and given that vehicles often travel between countries, it is generally desirable to be able to connect to a plurality of different network providers. This cannot generally be achieved using a single SIM. This problem is particularly acute where a vehicle crosses country boundaries, where available network operators may differ.

Further, many mobile telephone networks specify maximum data usage limits for particular SIMs, where exceeding the specified maximum data usage limit can result in an inability to send or receive further data, disrupting the provision of connectivity to users aboard the vehicle. Where a network operator allows data to be sent and received beyond the maximum data usage limit, heavy financial penalties are often levied. Again, this problem is particularly acute where a vehicle operates in different geographic areas, as using the data services of a national network operator with a SIM belonging to a network operator of a different country (i.e. "data roaming") also often carries very heavy charges.

One solution is to carry a large number of SIMs aboard the vehicle. In this way, different SIMs can be used in different areas, thereby ensuring connectivity. It is further possible to cease using one SIM before exceeding a maximum data usage limit, and to begin using another of the SIMs. In order to use the additional SIMs, however, it is also necessary to carry sufficient numbers of modems, together with a large number of antenna, splitters and dividers required to properly support the modems. This results in increased cost, complexity and maintenance requirements.

The above problems are amplified when fleets of vehicles are considered. As each SIM is carried aboard the vehicle, even a modest fleet of vehicles would require an unwieldy number of SIMs, and associated equipment.

Another solution is to use connection means other than those provided by mobile network operators, such as WiFi or WiMax networks which may not require authentication using SIMs. However, while such networks may be beneficial for providing network connectivity in specified predefined areas, such as stations, such networks are not widely available for the routes along which vehicles generally travel. As such, they cannot be relied upon, alone, to provide connectivity to a vehicle.

BRIEF SUMMARY

It is an object of embodiments of the invention to obviate or mitigate at least some of the problems outlined above.

According to a first aspect of the present invention, there is provided a method of providing connectivity to a vehicle, comprising at a first device aboard the vehicle: establishing at least one first connection with at least one first network, the at least one first connection allowing communication with a second device remote from the first device; transmitting via the at least one first connection an allocation request to the second device; receiving via the at least one first connection an allocation response from the second device, the allocation response indicating a first authentication device from a plurality of authentication devices remote from the first device; and establishing a second connection with a second network and authenticating the first device on the second network using the first authentication device.

In this way, the vehicle can make efficient use of a plurality of authentication devices, which can be allocated to the vehicle in dependence upon the vehicles requirements, without the vehicle carrying a plurality of authentication devices and associated equipment.

Communications between the first device and the first authentication device to authenticate the first device on the second network may be via the at least one first connection.

Establishing a second connection with a second network and authenticating the first device on the second network may comprises transmitting a connection request to a fourth device on the second network; receiving in response to the connection request a first authentication token; transmitting the first authentication token to the first authentication device; receiving a second authentication token from the first authentication device; and transmitting the second authentication token to the fourth device.

The method may further comprise selecting one of a plurality of second networks and the allocation request may comprise an indication of the selected one of the plurality of second networks. The first authentication device may associated with the selected one of the plurality of second networks.

The selection of one of the plurality of second networks may be based upon respective signal strengths of the plurality of second networks.

The second token may comprises a result of signing the first token signed with a key maintained by the first authentication device. For example, the first authentication device may maintain a secret cryptographic key, and upon receipt of the first authentication token, may sign the first authentication token with the secret cryptographic key to generate the second authentication token.

The first authentication device may be a subscriber identity module (SIM). Both or either of the first and second networks may be GSM networks.

The first connection may be established using a second authentication device co-located with the first device. That is, the device may comprise one or more authentication devices which may be used to authenticate the first device on a network. Establishing the first connection may comprise selecting said second authentication device from a plurality of authentication devices co-located with the first device.

The method may further comprise determining a geographical location. The allocation request may comprise an indication of the determined geographical location. The geographical location may be a current geographical location of the first device, or may be an anticipated or known future geographical location of the first device. The first authentication device may be associated with the determined geographical location. In this way, the authentication device is appropriate to the determined geographical location, whether this is a current or future geographical location.

The allocation response may indicate a third authentication device of the plurality of authentication devices remote to the first device and the method may further comprise establishing a third connection with a third network and authenticating the first device on the third network using the third authentication device.

Establishing a second connection may comprises switching between a first state in which a first modem of the first device uses an authentication device co-located with the first device to a second state in which the first modem uses the first authentication device.

In the second state a second modem of the first device may use a second authentication device co-located with the first device and establishing a third connection may comprise switching to a third state in which the second modem uses the third authentication device. That is, in the third state both the first and second modem use authentication devices remote from said first device. The method therefore allows a first modem to successfully switch from using a local (co-located) authentication device to a remote authentication device, before a second modem is switched from using a local authentication device to a remote authentication device. For example, the second modem may be used for the at least one first connection with the at least one first network, and for communication with the first authentication device while the first modem is configured to use the first authentication device. The first modem may then be used for communication with the third authentication device while the second modem is configured to use the third authentication device.

The allocation response may comprise a lease time and the method may further comprise transmitting a renewal request to the second device before the expiry of the lease time.

According to a second aspect of the present invention, there is provided a method of providing connectivity to a vehicle, comprising at a second device remote from the vehicle: receiving via a first connection with a first device aboard the vehicle, an allocation request; selecting a first authentication device from a plurality of authentication devices remote from the first device; transmitting an allocation response to the vehicle, the allocation response indicating the first authentication device.

The allocation request may comprise at least one criterion and the first authentication device may be selected based upon the at least one criterion. The at least one criterion may comprise at least one of a network operator and a geographical location.

According to a third aspect of the present invention, there is provided a method of providing connectivity to a vehicle, comprising: at a first device aboard the vehicle establishing at least one first connection with at least one first network, the at least one first connection allowing communication with a second device remote from the first device; transmitting from the first device via the at least one first connection an allocation request to the second device; receiving the allocation request at the second device; selecting at the second device a first authentication device from a plurality of authentication devices remote from said first device; transmitting from the second device via the at least one first connection to the first device an allocation response, the allocation response indicating the first authentication device; receiving the allocation response at the first device; and establishing at the first device a second connection with a second network and authenticating the first device on the second network using the first authentication device.

It will be appreciated that aspects of the present invention can be implemented in any convenient way including by way of suitable hardware and/or software. For example, a device arranged to implement the invention may be created using appropriate hardware components. Alternatively, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals.

It will be appreciated that features presented in the context of one aspect of the invention in the preceding and following description can equally be applied to other aspects of the invention.

BRIEF DESCRIPTION OF THE DRAWINGS/FIGURES

Embodiments of the invention will now be described, by way of example, with reference to the accompanying drawings, in which.

DETAILED DESCRIPTION

Figure 1:
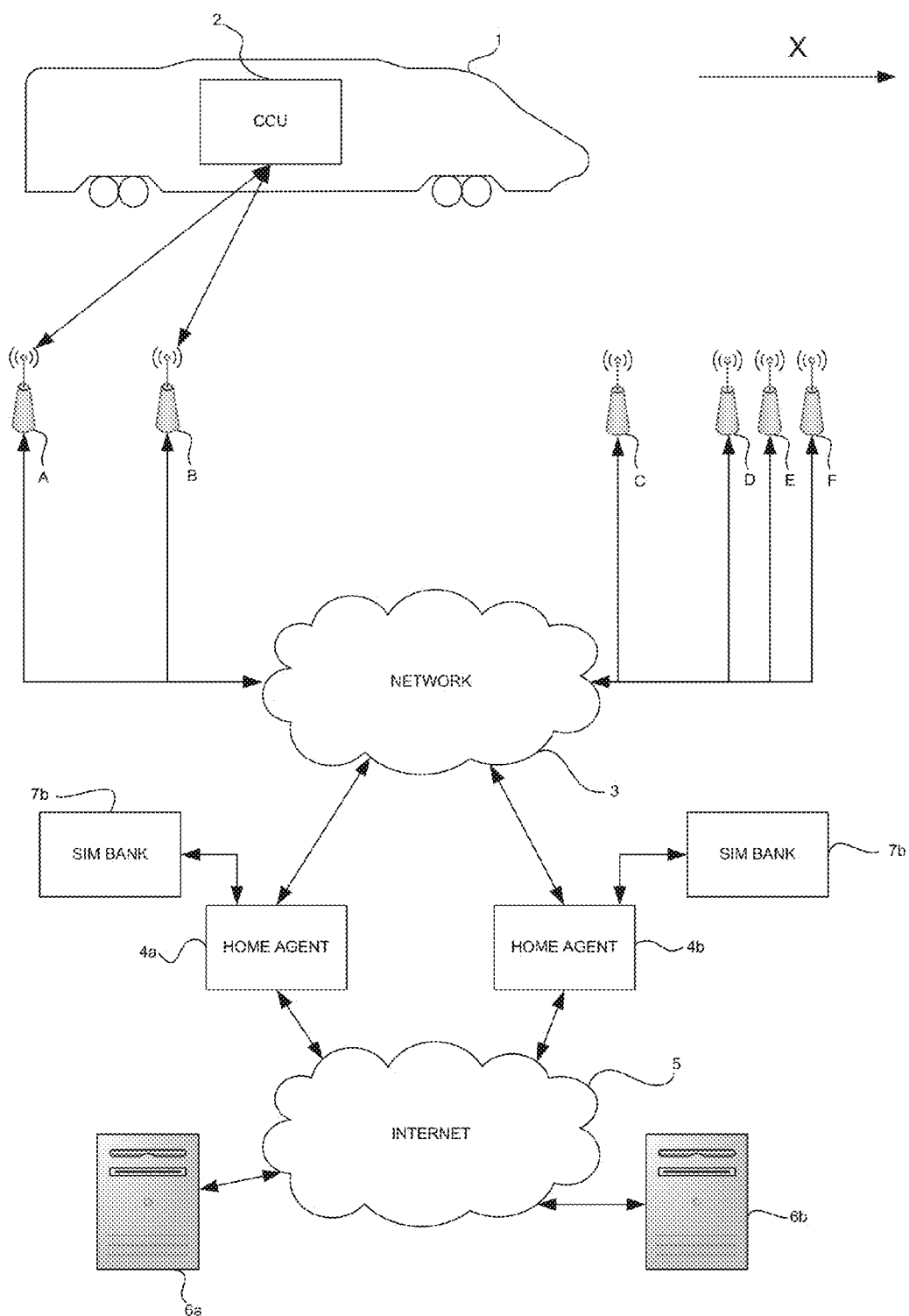
FIG. 1 is a schematic illustration of a network of computing devices.

FIG. 1 shows a network which is used to provide data communication to a train 1. The train 1 is provided with a communications control unit (CCU) 2 which is arranged to connect to base stations A to F, each of which are connected to a network 3. Both the CCU 2 and the base stations A to F are provided with wireless communications interfaces to allow a wireless connection to be established between the CCU 2 and the base stations A to F. Two home agents 4a, 4b are also connected to the network 3. Virtual communication tunnels are established between the CCU 2 and the home agents 4a, 4b, using data packet encapsulation, so as to allow data packets to be securely exchanged between the CCU 2 and the home agents 4a, 4b. The CCU 2 may connect to one home agent 4a, 4b in some circumstances (such as geographical proximity), and the other home agent 4a, 4b in other circumstances, or may connect to both the home agent 4a and the home agent 4b at the same time.

It will be appreciated that while FIG. 1 shows each of the base stations A to F directly connected to a single network 3, each base station A to F may be connected to one or more further networks which are in turn connected to the network 3. For example, the base station A may be connected to a GSM cellular network, while the base station B may be connected to an IEEE 802.16 (WiMax) network, each of which may be connected to the network 3. Further, while the Internet 5 and the network 3 are shown separately in FIG. 1, the network 3 may be connected to, and may at least partly include, the Internet 5.

The home agents 4a, 4b are connected to the Internet 5. Host computers 6a, 6b are also connected to the Internet 5. The connection of the CCU 2 to the home agents 4a, 4b through a communication tunnel means that from the point of view of computers connected to the Internet 5 (for example the host computers 6a, 6b), all traffic is seen to emanate from the home agents 4a, 4b, such that computers connected to the Internet 5 need not be concerned with details of the communication between the home agents 4a, 4b and CCU 2. Instead, computers connected to the Internet 5 can simply deliver data packets to the correct home agent 4a, 4b which can then process received data packets to ensure that such data packets are properly forwarded to the CCU 2.

The CCU 2 is arranged to provide wireless network connectivity on board the train 1. In this way passengers travelling on the train 1 can use mobile computing devices (such as laptop and palmtop computers, for example) to connect to the CCU 2 and thereby obtain access to the Internet 5. The connection between the mobile computing devices and the CCU 2 can take any suitable form, but may, for example, be in accordance with IEEE standard 802.11 (WiFi).

As the train 1 moves in the direction shown by the arrow X, the CCU 2 connects to different ones of the base stations A to F. Each base station A to F has a finite area within which it can receive and transmit data, and it is preferred that the finite areas overlap, such that there is a time during travel of the train during which the train is able to communicate with more than one of the base stations A to F. In FIG. 1, the train 1, and therefore the CCU 2 is within the signal range of both of the base stations A, B and is connected to both of the base stations A, B.

Figure 2:
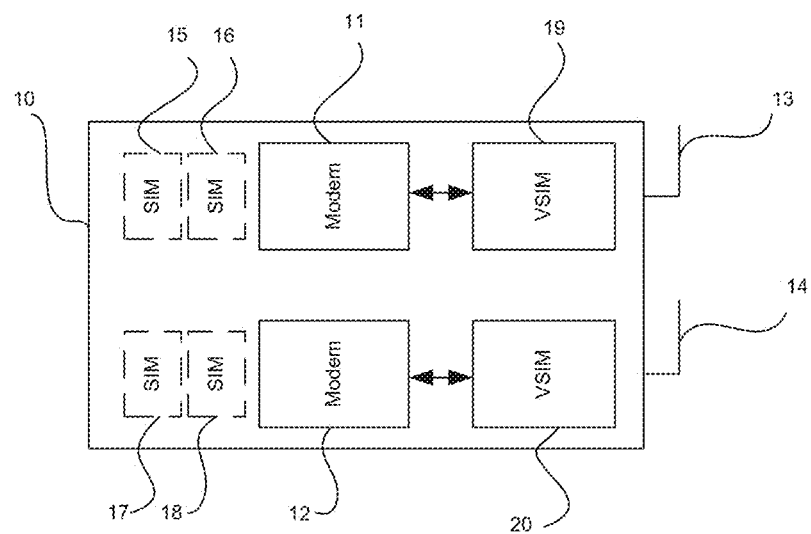
FIG. 2 is a schematic illustration showing hardware components of the CCU of FIG. 1 in more detail.

As described above, one or more of the base stations A to F may connect to mobile networks using GSM (Global System for Mobile Communications) based technologies such as UTMS and HSDPA networks. As is well known in the art, GSM based networks require users to authenticate themselves on the network using a Subscriber Identity Module (SIM). The CCU 2 therefore comprises suitable components to allow connection to, and authentication on, GSM networks. In particular, referring to FIG. 2, the CCU 2 comprises a modem mount 10, to which is attached two wireless modems 11, 12. While it will be appreciated that any suitable modem mount may be used, the F212 Mini Card Carrier by MEN Mikro GmbH, Nuremberg provides is suitable. Each of the wireless modems 11, 12 is adapted to communicate with the base stations A to F using antennae 13, 14 connected to the modem mount 10. The modem mount 10 is further configured to receive four physical SIMs, 15 to 18. The SIMs 15, 16 may be used by the modem 11, and the SIMs 17, 18 may be used by the modem 12.

The CCU 2 further comprises two virtual SIMs (VSIMs) 19, 20 which may be associated with the modems 11, 12 respectively. In some embodiments of the present invention, the VSIMs are implemented by way of an appropriate integrated circuit such as an ASIC or FGPA configured to receive and store details associated with physical SIMs. The VSIMs may be connected between a respective modem 11, 12 and the modem mount 10. As is described in more detail below, each VSIM is adapted to retrieve and store the details of a physical SIM stored at one or more SIM banks 7a, 7b (shown in FIG. 1 and described in more detail below with reference to FIG. 3).

It is to be understood that the train 1 is one train in a fleet of similar trains, each train in the fleet carrying a respective CCU, arranged similarly to that shown in FIG. 1. That is, each train in the fleet is arranged to provide connectivity to passengers aboard the train by connection to one or more of the home agents 4a, 4b via a CCU.

Figure 3A:
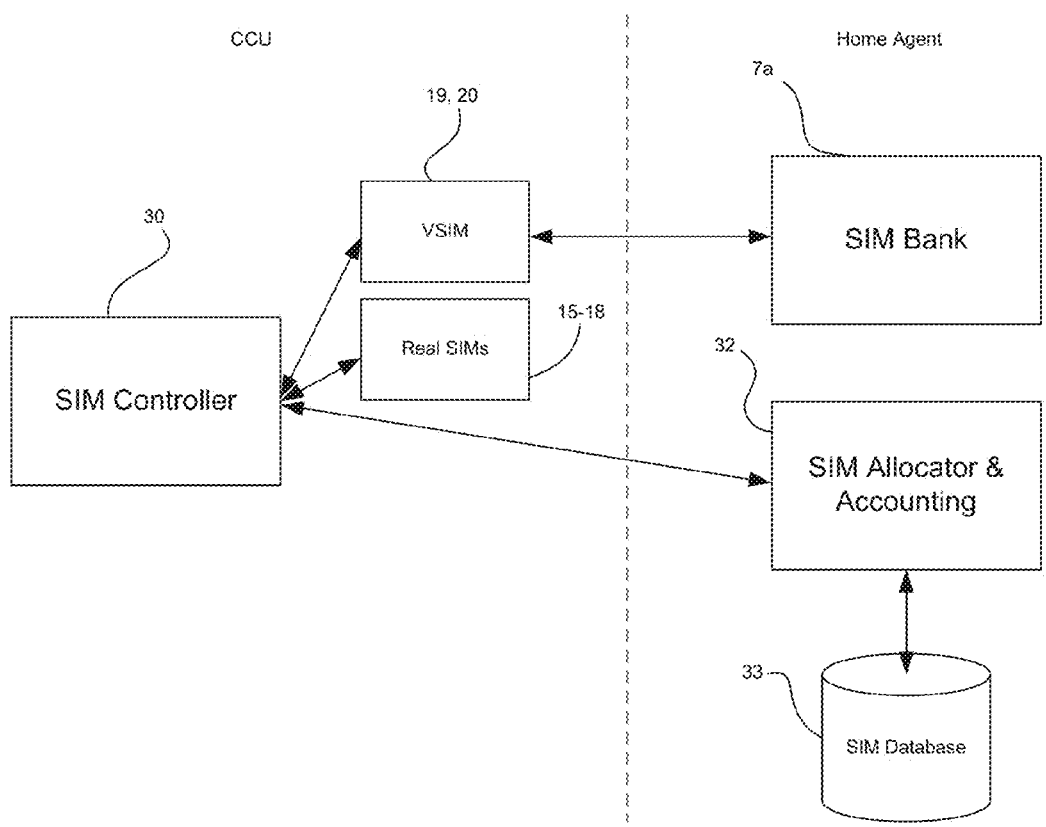
FIG. 3a is a schematic illustration of the logical architecture used to implement an embodiment of the present invention.

Referring to FIG. 3a, there is illustrated logical components of an embodiment of the present invention used to enable the CCU 2 to connect to networks via the base stations A to F. FIG. 3a is separated into two halves, the left half showing logical components of the CCU 2, and the right half showing logical components of the home agent 4a. On the left side of FIG. 3a, it can be seen that the CCU 2 comprises a SIM controller 30. The SIM controller 30 is configured to coordinate allocation of particular SIMs to each modem 11, 12, ensuring that each modem 11, 12 is allocated the most appropriate SIM at any point in time. For example, for the modem 11, the SIM controller 30 is configured to control whether, and which, one of the physical SIMs 15, 16 is to be used by the modem 11, or whether the VSIM 19 is to be used by the modem 11. The SIM controller 30 communicates with both the VSIM 19 and the modem mount 10 on which the physical SIMs 15 to 18 are mounted, using appropriate APIs to switch between use of different ones of the SIMs 15 to 18 and the VSIMs 19, 20.

On the right-hand side of FIG. 3a, it can be seen that the home agent 4a comprises a SIM bank 7a. The SIM bank 7a is configured to store a plurality of physical SIMs for use by the VSIM 19 aboard the CCU 2. For example, the "SIM Array IIIx" from implementa Gesellschaft fuer elektronische Verfahrenstechnik mbH, Hanover, Germany, is capable of storing up to four-hundred-sixteen physical SIMs. Each physical SIM stored in the SIM bank 7a is individually addressable by the VSIM 19 in order to allow the VSIM 19 to retrieve details of particular physical SIMs.

A SIM allocator and accounting module 32 is connected to a SIM database 33. The SIM allocator and accounting module 32 is responsible for allocating specific ones of the SIMs stored in the SIM banks 7a, 7b to the CCU 2 (and to any other CCUs in a fleet) and for ensuring that no two CCUs attempt to use the same SIM at the same time. The SIM database 33 stores the information required by the SIM allocator and accounting module 32 to allocate SIMs to the CCUs in the fleet. In general terms, the SIM database 33 stores, for each physical SIM stored in each of the SIM banks 7a, 7b, a unique identifier for that SIM, a network operator associated with the SIM, a country associated with the SIM, a CCU to which that SIM is currently allocated (if any), a lease time of the allocation (if any) the data usage of the SIM during a current accounting period, and a maximum data usage allowance of the SIM for the current accounting period (sufficient to allow determination of a remaining data allowance for the SIM).

Figure 3B:
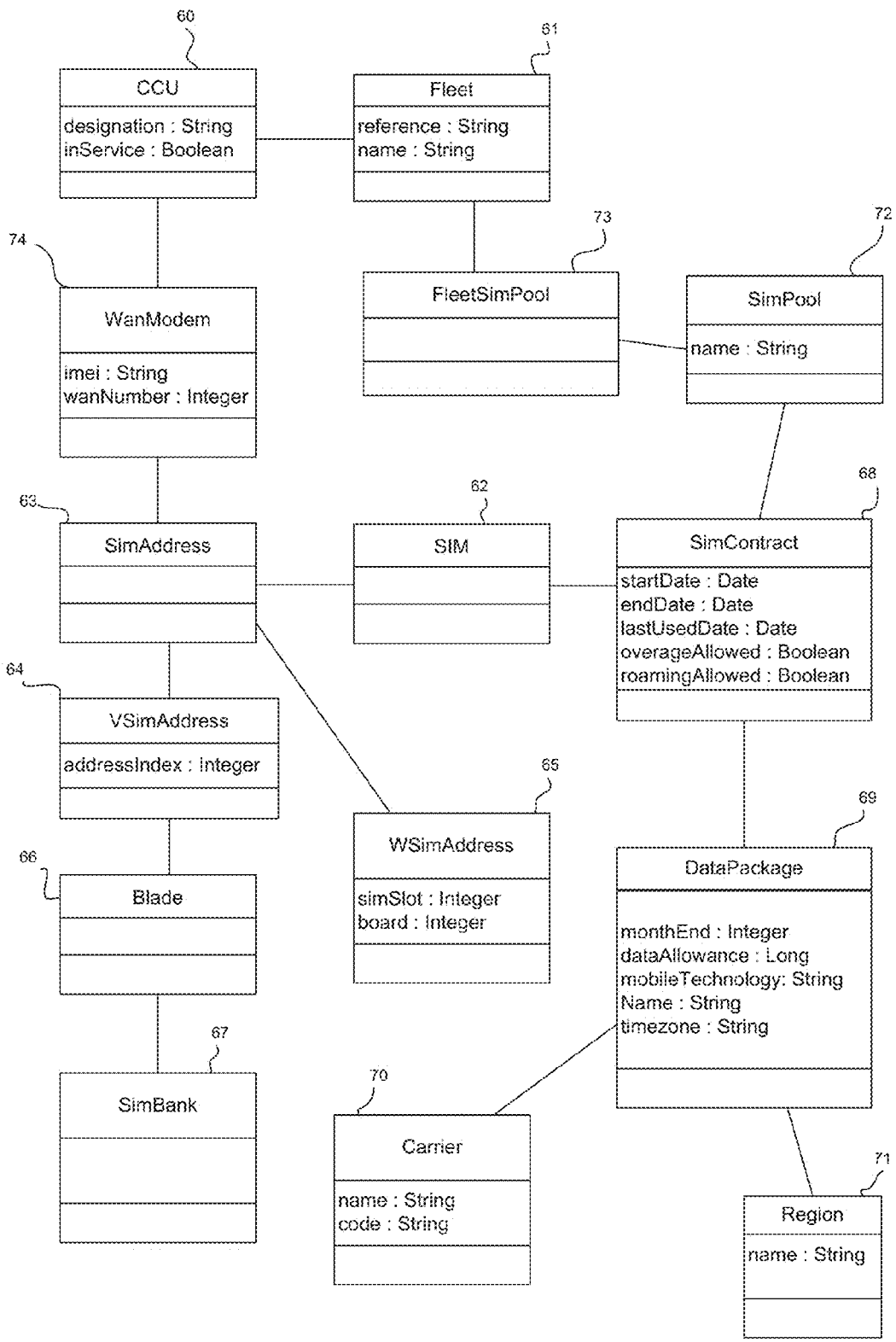
FIGS. 3b, 3c are schematic illustrations of logical entities, and relationships between those entities, used to implement an embodiment of the present the invention.
Figure 3C:
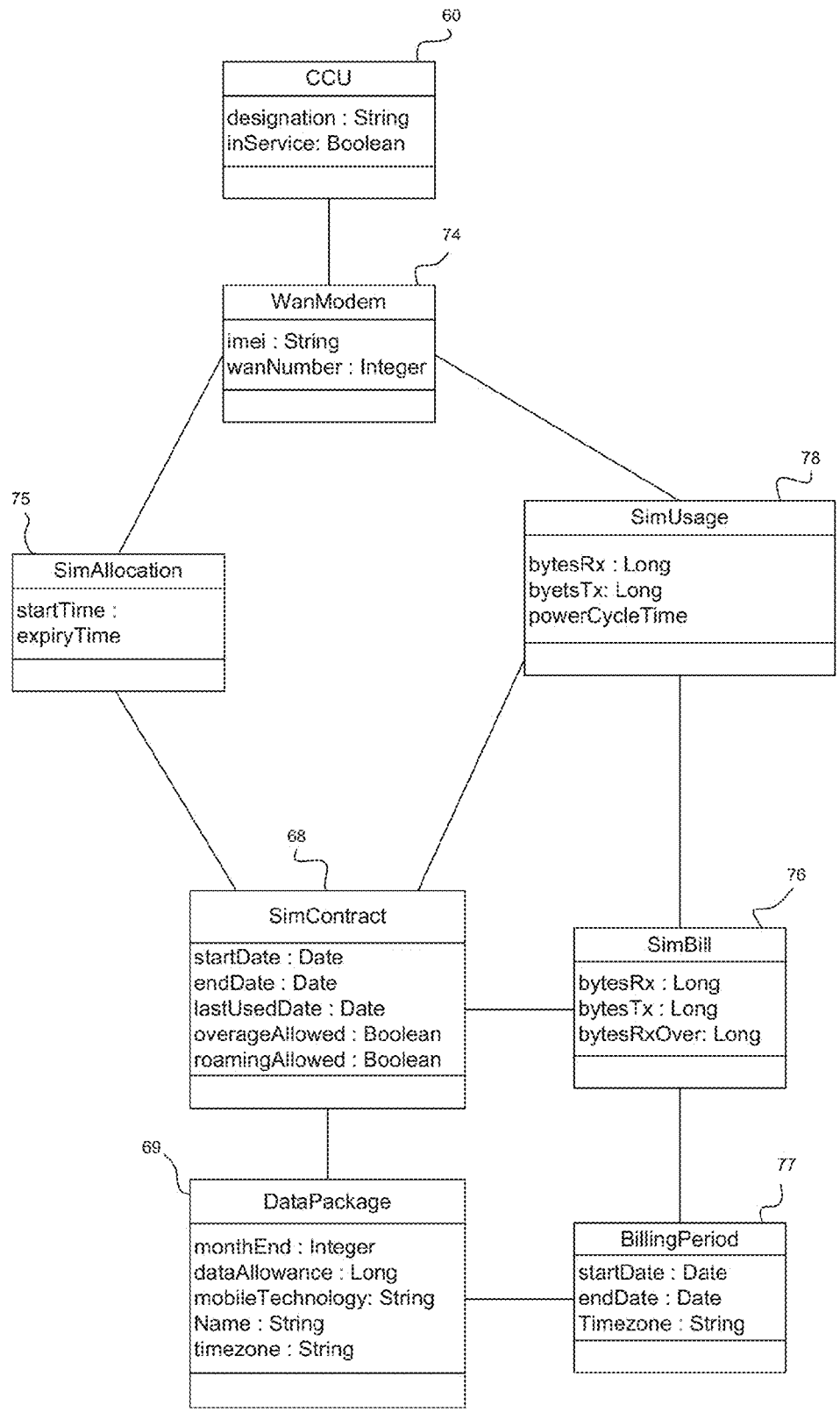

FIG. 3b is an example model that schematically illustrates logical entities which may be implemented in an embodiment of the invention. For example, one or more of the entities illustrated in FIG. 3b may be implemented as tables in the database 33, while attributes of those entities may be implemented as fields within those tables. It will be appreciated, however, that the tables of the database 33 need not map exactly to the entities in FIG. 3b. It will also be appreciated that one or more of the entities illustrated in FIG. 3b may be implemented as object classes and/or sub-classes within computer programs operating on the allocator and accounting module 32. Neither cardinality nor detailed relationship information is shown in FIGS. 3b, 3c because, as will be readily apparent to the skilled person, databases and programs may be constructed in any one of a plurality of ways based on the entities illustrated in FIGS. 3b, 3c. White data types are shown for some attributes of entities in FIGS. 3b, 3c it is to be again understood that these are merely exemplary.

A CCU entity 60 represents CCUs (i.e. each instance of the CCU entity, or record within a CCU table, represents a respective CCU) such as the CCU 2. The CCU entity 60 has a designation attribute which stores a unique identifier for the CCU, and an inService attribute indicating whether the particular CCU is currently in service or not. A Fleet entity 61 is used to represent fleets of trains to which CCUs may be assigned. The Fleet entity 61 comprises a reference attribute storing a unique identifier for a fleet, and a name attribute storing a name for the fleet.

A SIM entity 62 models the unique identifier that allows modems to access services on a mobile network. Each SIM has a SIM address, modelled by a SIMAddress entity 63, specifying where the SIM is located. The SIM address may be either a virtual SIM address within a SIM Bank (such as the SIM Bank 7a), modelled by a VSIMAddress entity 64, or an address aboard a modem (such as the modem 12), modelled by a VSIMAddress entity 65. Each virtual SIM address belongs to a blade, modelled by a Blade entity 66, with each blade belonging to a SIM Bank, modelled by a SIMBank entity 67.

Each SIM has a SIM contract, modelled by a SIMContract entity 68. The SIMContract entity 68 comprises attributes for modelling SIM contracts. In particular, a startDate and endDate indicate when a SIM contract starts and ends respectively, while a lastUsedDate indicates when the SIM was last used. An overageAllowed attribute stores an indication as to whether the SIM is permitted to exceed the data usage allowances provided by the contract, and the data usage allowances being modelled by a DataPackage entity 69. A roamingAllowed attribute of the SimContract entity 68 stores an indication as to whether the SIM is permitted to be used outside the country of the SIM Carrier, modelled by a Carrier entity 70. The DataPackage entity 69 comprises a monthEnd attribute indicating the day of the month on which one month's data allowance ends, and the next month's data allowance begins. A dataAllowance attribute stores an indication of the amount of data included within the data package, a mobileTechnology attribute stores an indication of the technology (e.g. EVDO, 3G, LTE, etc) supported by the data package. A Name attribute stores a name of the data package, and a timeZone field stores an indication of the time zone of the data package (e.g. for the purposes of determining when a day ends and begins).

As described above, the Carrier entity 70 models data carriers (sometimes referred to as network operators, or bearers) that are responsible for providing mobile network communication to a WAN modem via a valid SIM. The Carrier entity 70 comprises a name attribute and a code attribute, the code attribute uniquely identifying a carrier. The DataPackage entity 69 is also associated with a Region entity 71 modelling a geographic region where use of the SIM (associated with the data package) outside of that geographic region would constitute roaming. A data package may be associated with multiple regions. A plurality of SIM contracts may be packaged into a SIM pool, represented by a SimPool entity 72. Each SIM pool has a name, modelled by a name attribute of the SimPool entity 72. SIM pools may be allocated to fleets, the allocation of SIM pools to fleets being represented by a FleetSimPool entity 73, where a fleet can use the SIMs of the its allocated SIM pools.

The CCU entity 60 is also associated with a WanModem entity 74 which represents respective modems, such as the modems 11, 12. The WanModem entity is also associated with the SimAddress entity indicating that each SIM address may be associated with a modem.

In general, the entities, and data associated with the entities, illustrated FIG. 3c are expected to change infrequently. FIG. 3c schematically illustrates further entities (and their associations with some of the entities shown in FIG. 3b) which comprise data that is expected to change more frequently, during allocation of SIMs to modems by the SIM Allocator and Accounting module 32. A SimAllocation entity 75 models allocations of SIM contracts (the SIM contracts being modelled by the SimContract entity 68), to modems (the modems being modelled by the WanModem entity 74). While cardinality is not shown in FIGS. 3a, 3b and may vary in different embodiments, it will be appreciated from the description of FIG. 2, above, that in the presently described example embodiment, each SIM allocation is in respect of a single modem (i.e. each SIM contract/SIM can be allocated to one modem at a time), while each modem may have zero or more SIM allocations (up to two physical SIMs and one VSIM in the example of FIG. 2). The SimAllocation entity 75 comprises a startTime attribute and an expiryTime attribute storing the times at which the allocation begins and expires respectively.

The SIMContract entity 68 is associated with a SimBill entity 76. The SimBill entity 76 models running totals of data usage for a particular billing period, for a particular SIM. Each billing period is modelled by a BillingPeriod entity 77, with which the SimBill entity 76 is also associated. The SimBill entity 76 comprises a bytesRx attribute and a bytesTx attribute, respectively recording the total amount of data received and total amount of data transmitted in a particular billing period. The BillingPeriod entity 77 is also associated with the DataPackage entity 69 and comprises a startDate attribute and endDate attribute, respectively recording the start and end dates of the billing period. The BillingPeriod entity 77 further comprises a Timezone attribute, indicating the time zone with respect to which the billing period start and end dates are to be determined.

As is described in more detail below, the allocator and accounting module 32 updates the running totals of data usage, as modelled by the SimBill entity 76, from respective SIM usage reports received from CCUs. The SIM usage reports are modelled by a SIMUsage entity 78, which is associated with the SimContract entity 68, the SimBill entity 76, and the WanModem entity 74. The SimUsage entity 78 comprises a powerCycleTime attribute indicating the last time that the modem to which the SIM is allocated was power cycled, a bytesRx attribute and a bytesTx attribute indicating, respectively, the amount of data received and transmitted by the CCU using the SIM.

If the reported power cycle time of a SIM usage report is different to a reported power cycle time of a previous SIM usage report (i.e. the modem has power cycled since the last data usage report was received), the new data usage statistics (i.e. bytes written and bytes read) are added to the stored total data usage statistics for the SIM (e.g. in an instance of the SimBill entity 76/record of a SimBill table of the database 33). If, however, the reported power cycle time of a SIM usage report is the same as the reported power cycle time of a previously received SIM usage report, only the difference between the new data usage statistics and the previously reported data usage statistics are added to the stored total data usage statistics for the SIM.

To ensure that the modems 11, 12 are allocated the most appropriate SIM at any point in time, the SIM controller 30 operates in one of two modes, unmanaged or managed. In general terms, the SIM controller 30 is continuously attempting to operate in the managed state, operating in the unmanaged state only when it is unable to receive SIM allocations from the SIM allocator and accounting module 32.

Figure 4:
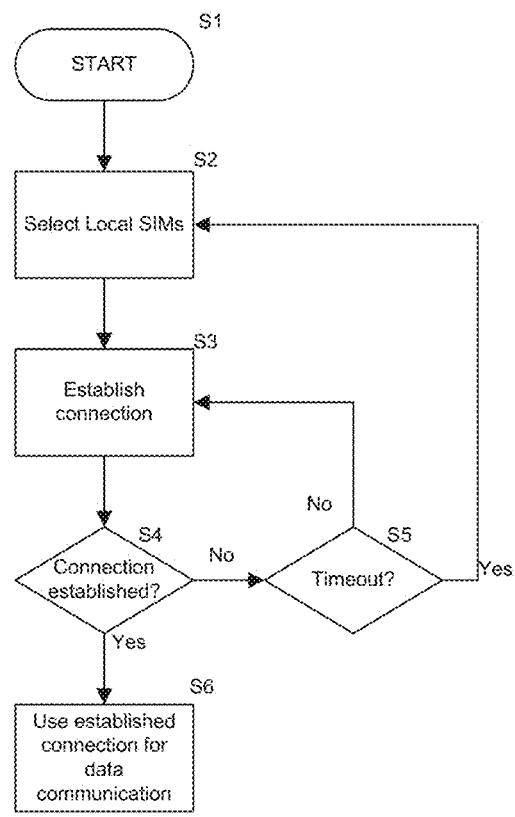
FIG. 4 is a flowchart showing processing carried out by a SIM controller of FIG. 3 to establish a network connection using local SIMs.

Referring to FIG. 4, there is illustrated processing carried out by the SIM controller 30 to allocate local SIMs to the modem 11 when operating in the unmanaged mode. The processing of FIG. 4 is also carried out (for example, simultaneously) for the modem 12 while the SIM controller is in the unmanaged mode. At step S1, the SIM controller 30 is initiated. Processing passes from step S1 to step S2 at which one of the local SIMs 15, 16 is selected for use by the modem 11. The selection of local SIMs 15 to 17 for use by the modems 11, 12 may be based upon any suitable criteria, such as geographic location of the train, remaining data allowances of each of the physical SIMs and preferred networks, etc. In order to make allocation decisions for local SIMs in the unmanaged mode, the SIM controller 30 therefore maintains a record of the appropriate information on which allocation decisions are to be based.

Processing passes from step S2 to step S3 at which the modem 11 attempts to establish network connections using the allocated SIM. Processing passes from step S3 to step S4 at which it is determined whether the modem 11 has established an operational connection with a network. If it is determined that the modem 11 has not established a connection with a network, processing passes to step S5 at which it is determined whether a timeout condition has occurred. If a timeout condition has not occurred, processing passes from step S5 to step S3 at which establishment of a network connection is retried. If it is determined at step S5 that a timeout condition has occurred, processing passes to step S2 at which the SIM controller 30 again selects between local SIMs. Operation of the selection of modems at step S2 may be modified as a result of the failure to connect at step S3. For example, upon determining that the modem 11 has been unable to connect to a network within a timeout period, the SIM controller 30 may select a different SIM for the modem 11. If, on the other hand, it is determined at step 4 that a network connection has been established by the modem 11, processing passes to step S6 at which that connection is made available for data communication.

Figure 5:
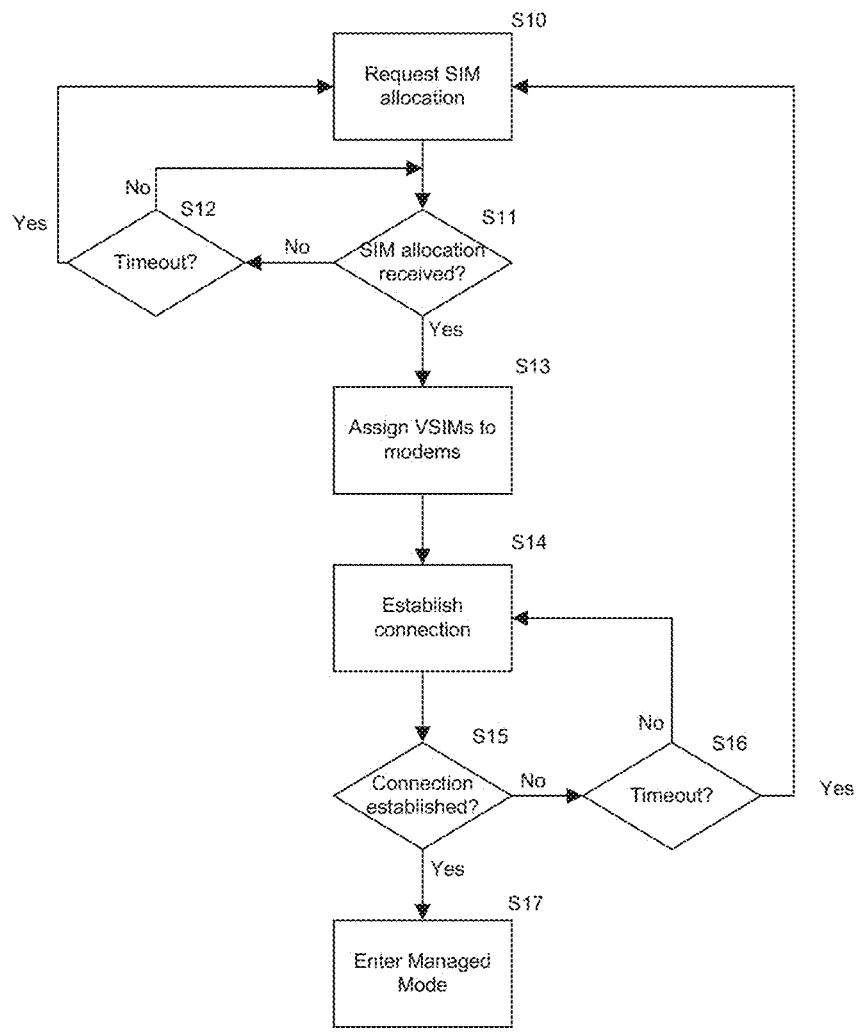
FIG. 5 is a flowchart showing processing carried out by the SIM controller to establish a network connection using remote SIMs.

Once an operational connection has been established by one of the modems 11, 12 using a local SIM, the SIM controller 30 attempts to establish communications with the SIM allocator and accounting module 32. FIG. 5 illustrates processing carried out by the SIM controller 30 to establish connection with the SIM allocator and accounting module 32. The processing of FIG. 5 is carried out using one or more of the available connections (e.g. connections of the modems 11, 12 established by the processing of FIG. 4) while the SIM controller 30 is operating in the unmanaged mode. At step S10, the SIM controller 30 transmits an allocation request data packet to the SIM allocator and accounting module 32, which may, for example, be a UDP packet, but can be a packet of any appropriate protocol.

Figure 6:
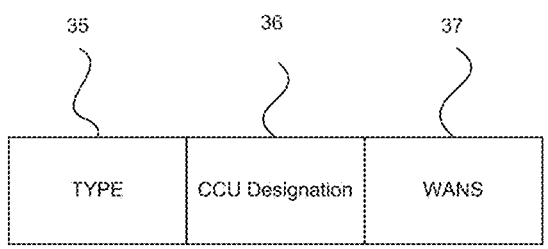
FIG. 6 is a schematic illustration of a SIM allocation request packet transmitted by the SIM controller.

The format of a SIM allocation request packet is schematically illustrated in FIG. 6. The SIM allocation request packet comprises a packet type field 35, a CCU designation field 36 and WAN details field 37. The packet type field 35 identifies whether the packet is a request packet (requesting a new SIM allocation) or a renewal packet (requesting renewal of an existing SIM allocation). The CCU designation field 36 contains a unique identifier of the CCU from which the allocation request originates. The WAN details field 37 contains, for each WAN for which the SIM controller 30 requires a centrally allocated SIM: a WAN number which uniquely identifies the WAN within the CCU, a country code indicating the country in which the CCU 2 current resides, a network operator code indicating a required network operator, and a technology code indicating the technology supported by the modem of the WAN (e.g. EVDO, 2G, 3G, LTE). In some embodiments of the invention, the SIM controller 30 may populate the required network operator details for a particular WAN based upon a determination of respective signal strengths of different networks in its current vicinity. That is, given that different network operators' networks have different geographical coverage, and operate at different spectral frequencies, at the time that an allocation request is made, the CCU 2 may be able to receive a stronger signal from a particular network operator. The SIM controller 30 may then specify that network operator in the WAN details field 37 for at least one of the WANs for which it requires an allocation.

In some embodiments of the present invention, the network operator need not be specified, allowing the SIM allocator and accounting module 32 to select an appropriate network operator based upon application requirements.

As an example, the SIM controller 30 may request a SIM allocation for both the modems 11 and 12 (which for the purposes of this example should be assumed to be 3G modems). In this case, the packet type field 35 will identify the packet as an allocation request packet, the CCU designation field 36 will uniquely identify the CCU 2 among other CCUs operating in a fleet, and the WAN details field 37 will specify WAN details for the modems 11 and 12. In this example, the WAN details 37 specify a WAN identifier "1" corresponding to the modem 11, a country code indicating the United Kingdom, a network operator code indicating the network operator T-Mobile® and an indication that the modem 11 supports 3G. The WAN details 37 further specify a WAN identifier "2" corresponding to the modem 12, a country code indicating the United Kingdom, a network operator code indicating the network operator Orange® and an indication that the modem 12 supports 3G.

It will be appreciated that the above described SIM allocation request packet format is merely exemplary and that SIM allocation request packets may comprise additional, or different, fields to those described above. Indeed, a SIM allocation request packet may comprise any information necessary for determining an appropriate SIM depending on particular application requirements.

Referring again to FIG. 5, processing passes from step S10 to step S11 at which it is determined whether a response to the SIM allocation request has been received. If it is determined that a response has not been received processing passes to a step S12 at which it is determined whether a timeout condition has occurred. If a timeout condition has not occurred, processing passes back to step S11. If it is determined at step S12 that a timeout condition has occurred, processing passes to step S10 at which the SIM allocation request is resent. Processing therefore loops between steps S10, S11 and S12 until a response to the SIM allocation request has been received.

Figure 7:
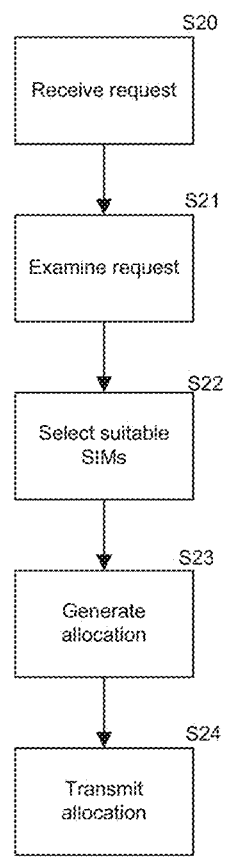
FIG. 7 is a flowchart showing processing carried out by a SIM allocator and accounting module of FIG. 3 to generate a SIM allocation.

FIG. 7 illustrates processing carried out by the SIM allocator and accounting module 32 to generate a response to a SIM allocation request packet. At step S20 an allocation request packet is received. Processing passes to step S21 at which the allocation request packet is examined to determine the number, and types of SIMs required. Processing then passes to step S22 at which, for each WAN specified in the SIM allocation request packet, the SIM allocator and accounting module 32 filters the SIM database 33 to produce a list of candidate SIMs which are suitable for that WAN (based on the requirements specified in the WAN field 37). Using the example above, for the WAN "1" associated with the modem 11, the SIM allocator and accounting module 32 would filter the SIM database 33 for UK SIMs on the T-Mobile® network, while for the WAN "2" associated with the modem 12, the SIM allocator and accounting module 32 would filter the SIM database 33 for UK SIMs on the Orange® network.

Where the SIM allocation request does not specify a particular network operator, the SIM allocator and accounting module 32 is configured to search for SIMs associated with national network operators (based upon the country code indicator). Once a candidate list of SIMs has been generated for a particular WAN, the SIM having the highest remaining data allowance among the candidate SIMs is selected. If the candidate list contains SIMs from a plurality of network operators because a particular network operator was not specified, the allocator and accounting module 32 attempts to allocate SIMs from a range of different network operators, using, for example round robin selection.

Figure 8:
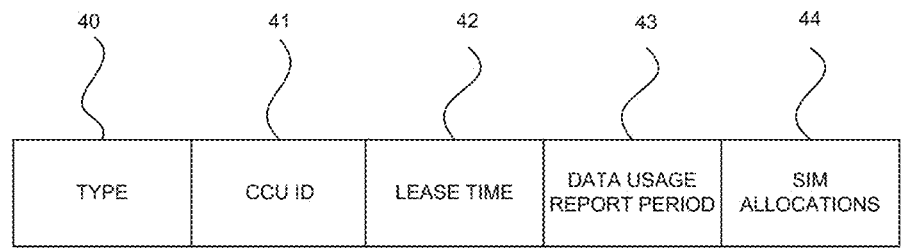
FIG. 8 is a schematic illustration of a SIM allocation response packet transmitted by the SIM allocator and accounting module to the SIM controller.

Processing passes from step S22 to step S23 at which the selected ones of the candidate SIMs are compiled in a SIM allocation response packet. The format of the SIM allocation response packet is shown in FIG. 8 and comprises a type field 40 identifying the packet as a SIM allocation response packet, a CCU ID field 41 identifying the CCU for which the SIM allocation is intended, a lease time field 42, a data usage report period 43 and a SIM allocations field 44. The CCU ID field 41 is used in an error check operation by the receiving CCU to ensure that it has received the correct allocation. The lease time field 42 indicates the period for which the CCU can use the allocated SIMs before the CCU must request a renewal of the lease. The data usage report period 43 specifies how often the CCU must report data usage of its assigned SIMs to the SIM allocator and accounting module 32. The SIM allocations field 43 comprises, for each WAN specified in the allocation request: the WAN number, a SIM identifier and the remaining data allowance on the assigned SIM. The SIM identifier indicates either one of the local SIMs associated with the modem of the WAN, or an IP address of the SIM bank at which the SIM is stored, together with an identifier for identifying the SIM within the SIM bank.

At step S24 the SIM allocation response packet is transmitted to the requesting CCU for processing.

Referring again to FIG. 5, upon receipt of a SIM allocation from the SIM allocator and accounting module 32, processing passes from step S11 to step S13. At step S13 the SIM controller 30 configures the VSIMs 19, 20. In particular, the SIM controller 30 instructs at least one of the modems 11, 12 to switch from using a local SIM to using its respective VSIM. During a CCU's switch over from use of local SIMs to VSIMs, at least one non-VSIM external connection is maintained in order to allow communications between the CCU and the SIM banks 7a, 7b. In some embodiments of the present invention, to avoid potential loss of external connectivity in the event of failure, no more than half of the modems of a CCU are configured at step S13. For example, where SIM allocations have been received for both of the modems 11, 12, the SIM controller 30 may instruct the modem 11 to use the VSIM 19, while the modem 12 continues operating with one of the local SIMs 17, 18.

Figure 9:
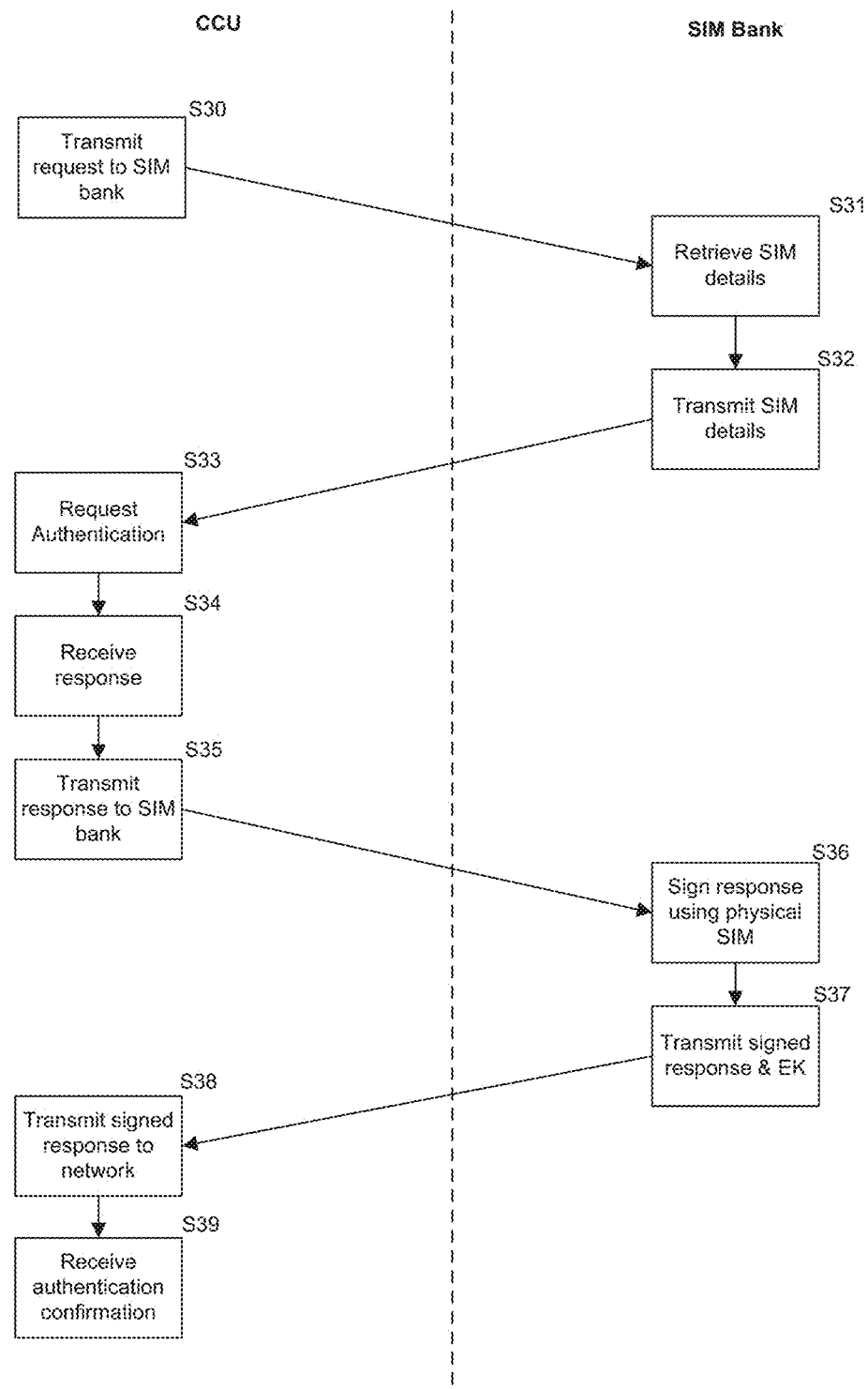
FIG. 9 is a flowchart showing processing carried out by both the SIM controller and a SIM bank of FIG. 1 to establish a connection between the CCU of FIG. 1 and a mobile network.

In order to establish an operational data connection, a VSIM authenticates itself on a network using the SIM details of its assigned SIM. The processing carried out by a CCU and a SIM bank at step S14 is now described with reference to FIG. 9. At step S30, the CCU transmits a request to the SIM bank for the details of the physical SIM stored at the address received from the allocation and accounting module. Processing then passes to step S31 at which the SIM bank retrieves details of the requested SIM. In particular, an Integrated Circuit Card Identifier (ICCD) and an International Mobile Subscriber Identity (IMSI) of the requested SIM are retrieved at step S31 and transmitted to the CCU at step S32. The ICCD internationally identifies the SIM, while the IMSI identifies the SIM on the network of a particular network operator. Each SIM further comprises a key $k_s$ assigned to the SIM by the network operator to which the SIM belongs. A corresponding key $k_n$ is stored by the network operator. The key $k_s$ is not obtainable by the CCU or the SIM bank and is therefore not retrieved or transmitted to the CCU at steps S31, S32.

Processing passes to step S33 at which the VSIM of the CCU transmits a request for authentication on the network, the request including the IMSI of the physical SIM card. Upon receipt of the authentication request, the network operator generates a random number, R and signs R with the key $k_n$ to generate a signed key $SR_1$. The network operator transmits R to the VSIM, which is received at the CCU at step S34. At step S35, the CCU transmits R number to the physical SIM at the SIM bank. At step S36, the physical SIM signs R with the key $k_s$ to generate a signed key $SR_2$ and transmits $SR_2$, together with an encryption key $k_e$ to the CCU at step S37. Processing passes to step S38 at which the VSIM transmits $SR_2$ and the encryption key $k_e$ to the network operator. The network operator compares the $SR_2$ to $SR_1$ and, if they match, authenticates the VSIM on the network. The encryption key $k_e$ is used to encrypt all further communications between the VSIM and the network operator. An authentication confirmation is transmitted to the VSIM, and is received at step S39.

Returning again to FIG. 5, at step S15 the SIM controller 30 determines whether an operational data connection has been established using at least one VSIM. If it is determined that a connection has not been successfully established, processing passes to step S16 at which it is determined whether a timeout condition has occurred. If a timeout condition has not occurred, processing passes to step S14 to retry establishing a connection. If it is determined at step S16 that a timeout condition has occurred, processing passes to step S10, at which a new SIM allocation request is made for at least the modems which have been unable to connect using the allocated SIM details.

Where it is determined at step S15 that an operational network connection has been established using the allocated SIM details, processing passes to step S17 at which the SIM controller 30 transitions to the managed mode and switches each modem to operate using its respective VSIM and centrally allocated SIM details. It will be appreciated that once a data connection has been successfully established by one VSIM, that data connection can be used for the communications between the CCU and the SIM banks described above with reference to FIG. 8 for configuring and authenticating other VSIMs.

Figure 10:
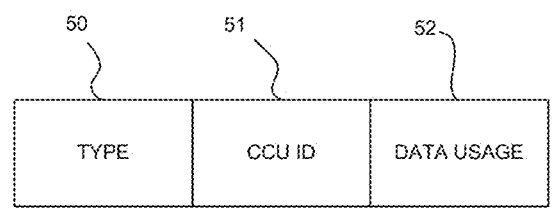
FIG. 10 is a schematic illustration of a data usage report packet transmitted by the SIM controller.

When operating in the managed mode, the SIM controller 30 transmits data usage reports to the allocator and accounting module 32, the frequency of the data usage reports being dictated by the data usage report period field 43 in the SIM allocation response packet received from the allocator and accounting module 32. The format of the data usage report packets is schematically illustrated in FIG. 10, and comprises a type field 50 to identify the type of data packet (in this case indicating a data usage report), a CCU ID field 51 indicating the CCU issuing the data usage report and a data usage field 52. The data usage field comprises, for each WAN currently using a VSIM: a WAN identifier number, the last power cycle time of the modem, the number of bytes read since the last power cycle and the number of bytes written since the last power cycle. While in the described embodiment, the CCU 2 reports data usage since the last power cycle, the period of data usage reported by the CCU 2 to the allocator and accounting module 32 can be any appropriate period.

The allocator and accounting module 32 processes each data usage report and updates the relevant fields in the SIM database 33 to keep track of the total data usage of each SIM. In particular, if the current reported last power cycle time is different to the last reported power cycle time (i.e. the modem has power cycled since the last data usage report was transmitted), the new data usage statistics (i.e. bytes written and bytes read) are added to the stored total data usage statistics for the SIM. If, however, the current reported last power cycle time is the same as the previously reported last power cycle time, only the difference between the new data usage statistics and the previously reported data usage statistics should be added to the stored total data usage statistics for the SIM. In order to ensure that data usage statistics are not "lost" when a modem is power cycled between the sending of data usage reports, data usage reports may be sent upon power cycling of modems. The stored total data usage statistics are used in combination with the known data usage limit of each SIM to calculate a remaining data allowance.

The above described method may not be entirely accurate where, for example, network operators introduce additional packet headers for control purposes, or count packet retries towards a SIM's data allowance. To provide more accurate data usage, periodic querying of network operators usage statistics may be performed.

At the end of each SIMs accounting period (i.e. on the date at which the data allowance provided by the network operator resets) the allocator and accounting module 32 resets the corresponding usage statistics in the SIM database 33. Prior to resetting of the data usage record for a particular SIM, the current data usage record is copied to an archive table of the SIM database 33 for auditing and analysis purposes.

Data reports may be transmitted from the SIM controller 30 for the local SIMs 15 to 19. For example, data usage reports may be complied by the SIM controller 30 when operating in the unmanaged mode for transmission to the SIM allocator and accounting module 32 upon connection.

Before expiry of the lease of a particular SIM allocation, the SIM controller 30 transmits a renewal request to the allocator and accounting module 32. The renewal request has the same format as the SIM allocation request packet illustrated in FIG. 6. For renewal requests, however, the type field 35 indicates that it is a renewal request, while the WANS field 37 indicates the WAN details for each WAN that requires renewal of the SIM lease being used by that WAN. Under normal operating conditions, the allocator and accounting module 32 re-allocates the same, currently assigned, SIMs upon receipt of a renewal request. However, it will be appreciated that renewal behaviour may be varied based upon application specific requirements. For example, it may be desirable to alter the allocated SIMs where geographical or data usage changes have occurred. For example, where an assigned SIM passes its data usage limit for the current accounting period, the allocator and accounting module 32 may assign a different SIM in response to a renewal request. Where a SIM controller 30 receives a response to a renewal request indicating that a different SIM has been allocated, the SIM controller 30 performs the processing described above with reference to FIG. 9 to authenticate the newly assigned SIM with the appropriate network operator.

If the SIM controller 30 fails to renew a lease for an assigned SIM, the allocator and accounting module 32 assumes that the CCU no longer requires the assigned SIM and returns the assigned SIM to the pool of SIMs available to be assigned to other CCUs. The allocator and accounting module 32 may provide a "grace period" before returning any non-renewed SIMs to the pool in order to ensure that the CCU 2 has stopped using the SIM.

Additionally, while operating in managed mode, after the initial authentication, the network operator may periodically require each SIM to re-authenticate itself using the key $k_s$ at a time interval set by the operator. In more detail the network operator may issue a challenge, requesting re-authentication. Upon detecting the challenge at the SIM Controller 30, it is determined whether the challenge is the same as the last challenge (e.g. from a cache of challenge/challenge response data stored at the CCU). If the current challenge from the network operator is the same as the previous challenge, this indicates that the network operator has not changed the key $k_s$. In this case, the VSIM returns the same challenge response that was issued in response to the previous challenge (obtained from the cache). Where the current challenge is different to the previous challenge, this indicates that the network operator has changed the key $k_s$ assigned to the physical SIM. In this case, the VSIM makes a request to the SIM bank at which its physical SIM is stored for the SIM to sign an authentication request, similarly to the processing described above at steps S24 to S28 of FIG. 7.

It is noted above that when in the unmanaged mode, the SIM controller 30 generally attempts to transition to the managed mode so that the most appropriate SIMs can be allocated to the modems of the CCU from all of the available SIMs stored at the SIM banks 7a, 7b. In general, therefore, it is undesirable for the CCU 2 to transition from the managed state to the unmanaged state. However, where the train 1 moves to an area in which there is no mobile network coverage and in which there the CCU 2 does not have access to non-mobile networks such as WiFi networks, the SIM controller 30 is unable to renew leases for its assigned SIMs and transitions into the unmanaged state.

Upon transitioning to the unmanaged state, the SIM controller 30 instructs each modem 11, 12 to use one of the local SIMs 15 to 18. In this way, when the train 1 leaves an area of no connectivity, connections with the allocator and accounting module 32 can be quickly re-established. In the event that the train 1 moves to an area in which there is no mobile network connectivity, but in which the CCU 2 has access to other networks such as WiFi networks, the other network connections can be used to communicate with the allocator and accounting module 32 to renew any SIM leases. As such, if any communication paths are available between the CCU 2 and the allocator and accounting module 32, the SIM controller 30 does not transition from the managed mode to the unmanaged mode.

In the embodiment described above, the arrangement of the home agent 4b is similar to that of 4a. That is, the home agent 4b comprises the SIM bank 7b, an allocator and accounting module and a SIM database. As allocation of SIMs and recordal of SIM usage details is centralised, the provision of multiple allocator and accounting modules and SIM databases is used to provide redundancy and to allow for failover to occur. In some embodiments of the present invention only one of any SIM allocator and accounting modules serving a particular fleet is configured to be active at any time. Each of the remaining SIM allocator and accounting modules are configured to operate in a standby mode, from which they may be switched to into an active mode in the event that the current active SIM allocator and accounting module should fail. In this arrangement, each CCU in a fleet directs all traffic destined for the SIM allocator and accounting packet to the home agents to which it is currently connected. Each home agent re-directs traffic to the active SIM allocator and accounting package.

For example, in the embodiment illustrated in FIG. 1 and described with reference to FIG. 3, where the CCU 2 is connected to the home agent 4b, but the SIM allocator and accounting package 32 of the home agent 4a is active, the CCU 2 directs its SIM allocation requests and data usage reports to the home agent 4b. The home agent 4b, identifying (for example by port number) that the received data packets are directed to the SIM allocator and accounting module, redirects the received data packets to the active SIM allocation and accounting module 32 of the home agent 4a. In the event that a different SIM allocator and accounting module becomes active, correct redirection of SIM allocation requests and data usage reports is facilitated through a corresponding change in the routing logic of each of the home agents.

Updates to each of the SIM databases in each of the home agents is performed by the active SIM allocator and accounting module. In this way, the SIM databases can be kept current so that they are ready to assume active responsibilities. It will be appreciated that the SIM databases may be kept synchronised using any appropriate method. For example, the databases may be kept synchronised using database replication, or as an alternative example, through the master allocator and accounting module performing multiple updates to multiple databases. The standby FIG. 1 illustrates an embodiment in which physical SIMs are spread across a number of SIM banks equal to the number of home agents in order to provide redundancy and allow for failover (it will be appreciated that while two home agents and SIM banks are shown in FIG. 1, that any number of SIM banks and home agents may be provided). It is generally preferred that the CCU 2 (and each CCU in the fleet) is allocated SIMs from a plurality of SIM banks 7a, 7b. In this way, in the event that one of the SIM banks 7a, 7b becomes unreachable, only those modems allocated SIMs from the unreachable SIM banks will fail to connect to a network.

It will further be appreciated that any number of home agents may be provided. Similarly, while the above described embodiment comprises two SIM banks 7a, 7b, each located with a respective home agent 4a, 4b, any number or configuration of SIM banks may be provided. For example, in order to provide maximum redundancy and failover there may be a respective SIM bank for each home agent. In alternative embodiments, only some home agents have a corresponding SIM bank. Furthermore, while described as part of the home agents 4a, 4b in the present embodiment, SIM banks 7a, 7b need not be co-located with the home agents.

While the embodiment described above employs two modems, each with two physical SIMs aboard the CCU 2, it will be appreciated that any combination of modem carriers, modems and SIMs may be used. Indeed, in some embodiments the CCU 2 need not carry physical SIMs, where initial connectivity may be provided by non GSM connections such as WiFi or WiMax. Alternatively, additional physical SIM cards may be carried aboard a vehicle. For example, the circuit board on which the VSIM is implemented may be configured to provide additional physical SIM mounts.

It is described above that the decision as to which SIM should be used by a CCU may be based upon geographic information. The CCU 2 is therefore provided with means for determining its geographic location, such as a GPS receiver. There is now described an example method of configuring the CCU 2 to utilise "geographic zones" to identify changes in geographic position in both the managed and unmanaged states. In present embodiment, the CCU 2 is provided with a configuration file in which, for each WAN managed by the CCU 2, a list of zones in which the train 1 travels is provided. For each zone, a local SIM is specified to provide a default local SIM when the SIM controller 30 operates in the unmanaged mode. VSIM details are provided to direct operation in the managed mode.

For example, for a CCU having three modems (and therefore three WANs), operating in Canada, the USA and Mexico, a suitable configuration may be as follows:

[wan1]
zone=usa(sim=1, vsim=usa:T-Mobile:yes)
zone=canada(sim=0, vsim=canada:*:yes)
zone=mexico(sim=0, vsim=mexico::yes)
[wan2]
zone=usa(sim=0, vsim=usa:Verizon:no)
zone=canada(sim=1, vsim=Canada*::no)
zone=mexico(sim=0, vsim=mexico:Telcel:no)
[wan3]
zone=usa(sim=0, vsim=usa:*:no)
zone=canada(sim=0, vsim=canada:Rogers:no)
zone=mexico(sim=1, vsim=mexico::no)

Referring to the above, the "sim" variable takes a single parameter, which is a static local SIM identifier, or a static reference to a particular VSIM in a SIM bank. For example: "sim=0" means that no SIM should be allocated to that WAN;
"sim=1" means that the first local SIM should be used;
"sim=2" means that the second local SIM should be used.
"sim=78.40.152.70:3:23" would mean that SIM number 23 on a card 3 at the SIM bank at IP address 78.40.12.70 should be used.

The "vsim" variable takes three parameters separated by colons. In particular, the "vsim" variable takes a country code indicating the current country, a network operator name indicating a required network operator, and an overage use indicator indicating whether a SIM will be used after its data allowance has been exceeded.

In above example configuration would, therefore, in the unmanaged mode, provide one working SIM active in, and appropriate for, each country in which the train 1 travels. In the managed mode, when the train is operating in the USA, the WAN "wan1" would request SIMs for the T-Mobile network and would use SIMs after their data usage has been exceeded, the WAN "wan 2" would request SIMs for the Verizon network and would not use SIMs after their data usage has been exceeded, while the WAN "wan 3" does not specify a network operator (such that the most appropriate network operator would be selected by the active SIM allocator and accounting module), and would not use SIMs after their data usage has been exceeded.

It will be appreciated that in the event that the SIM controller 30 requests a SIM for a network operator for which there are no suitable SIMs (e.g. there are no unallocated SIMs or no SIMs for which the data usage limit has not been exceeded) in any of the available SIM banks 7a, 7b, the operation of the allocator and accounting module 32 is application specific. For example, the allocator and accounting module 32 may continue allocate SIMs of a requested network operator for which the data usage limit has been exceeded rather than allocating SIMs of a different network operator for which data usage has not been exceeded. Alternatively, the allocator and accounting module 32 may allocate SIMs on a different network operator before allocating SIMs for which the data usage has been exceeded.

The use of geographic zones to modify the allocation of SIMs to modems of the CCU is only one example of behaviour of the CCU that may be configured for use with geographic zones. Furthermore, geographic information is only one example of the type of contextual information that may be used to derive "zones" which can be configured to cause modification of behaviour of the CCU. At a conceptual level, therefore, a zone is an arbitrary set of criteria, against which a CCU can evaluate whether it is currently within a zone, or outside of a zone. A zone may, therefore, be defined as a function of any variable to which the CCU has access. Upon determination that "in zone X" evaluates as true, the CCU is configured to perform behaviour "Y". Upon leaving a zone, the CCU returns to operating in either a default manner, or, in the event that the CCU transitions between zones, according to conditions set by another zone.

As described above, one application of zones is based upon a train's current geographical position. Geographic zones are defined as an area of land through which a vehicle may pass. It will be appreciated that geographic zones may be defined in any appropriate way. For example geographic areas may be specified as polygons on a map, with an arbitrary number of vertices. Further examples of zones, are time and speed based zones. For example, a zone may be defined as a span of time which can be set to repeat on specific days of the week, on specific days of the month, etc. As a more concrete example, a time-based zone may be based upon the knowledge that a train is only in service from 06:00 to 23:00 on weekdays, and appropriate behaviour (such as disabling modems during times outside the time-based zone), can be defined.

Speed zones may be defined as below, using a "speed" state variable:
Zone='slow' where 'speed' is less than 50 mph
Zone='medium' where 'speed' between 50 and 100 mph
Zone='fast' where 'speed' greater than 100 mph.

State variables, such as "speed" or "geographic position" above are used and defined by programs operating on the CCU. These are created on an ad-hoc basis to suit the needs of the particular programs that are running. As such, it is not necessary to maintain an exhaustive list of available variables which may form the basis of zone processing. Rather, programs operating on the CCU and a zone manager operating on the CCU can be provided with appropriate publish/subscribe mechanisms to allow the zone manager to detect events within those programs.

It may, however, be beneficial to maintain a number of well defined variables that always exist. For example state variables recording signal strengths of radios aboard the CCU, or whether particular WANs are being used may be maintained as a standard set of variables accessible by the zone manager.

As zones may be defined by any variable, it will be appreciated that zones may overlap one another. The operation of the zone manager where zone overlap occurs is application specific. One way to address overlapped zones is by the creation of aggregate zones. In this way, there is provided a straightforward method of defining zones based on multiple criteria, or for aggregating smaller zones into larger ones. Aggregate zones may be one of two types. For an 'OR' type of aggregate zone, a CCU is considered to be within the zone if the CCU is in any of the constituent zones. For an 'AND' type of aggregate zone, the CCU is considered to be within the zone only if the CCU is in all of the constituent zones. This allows, for example, for a country to be defined as a series of rectangles using the 'or' aggregate zone function. It also allows the definition of a zone where downtime of the CCU is allowed only, for example, within the geographic area of a service yard AND between the times of 2 am and 4 am.

As indicated above, upon detection by the zone manager aboard the CCU that the CCU is within a particular zone, the zone manager is responsible for causing a change in an operating mode of the CCU in a predefined way. In some embodiments, the zone manager may alter the value of variables which define devices to which the CCU connects. As an example other than that given above concerning SIM usage, in response to detection of changes in a geographic zone, the zone manager may alter the values of a "Server_ip" variable containing a list of home agents that should be used by the CCU. Additionally, arbitrary scripts or programs may be configured to execute upon detection of the CCU moving into or out of a zone. For example, a script may be provided to change the language of a "landing page" presented to users aboard the train upon determination that a train has crossed a country (and language) border.

To facilitate application development, and use of zones by third party applications, zone states can be made available in a Simple Network Management Protocol Management Information Base (SNMP MIB) of the CCU. A MIB may provide a table of arbitrary length, with one row of the table per zone, each row containing the name of the zone, and its current state. To facilitate the retrieval of this information from the MIB table, an index is specified for a particular zone.

In addition to parameters applying to specific zones, each zone is configurable with a number of default variables, as is now described. Zones based upon on variables having analogue values (such as geographic zones, or speed zones) may be configured with a hysteresis value to stop the state of a zone 'flip flopping' when near to the threshold value of the variable. That is, a hysteresis value may define an amount by which a variable must exceed a particular threshold before a change in zone status is triggered. A train sat on the border of two countries, for example, may experience some "GPS drift" which causes the appearance that the train is moving from one side of the border to the other. By configuring a geographic zone with a hysteresis value of, for example, one mile, the CCU must travel at least one mile into the zone before the zone state is updated. Similarly, when leaving the zone, the CCU must travel one mile beyond the zone before the zone state is updated.

Zones may further be configured with a debounce period. A debounce period limits the rate at which the change of state of a zone can occur. This again helps to ensure that when a CCU is close to a zone boundary, the zone state does not constantly flip flop. A debounce period is usable for zones defined in relation to both digital and analogue variables as a way of dealing with noise, flutter or 'Bounce'. A default debounce value, measured in seconds, may be specified, which applies to each zone unless that zone specifies a specific debounce period.

Each zone may be configured with a stickiness attribute, defining the behaviour of the zone when the inputs required to determine the state of the zone become unavailable. If a zone is non-sticky and the inputs used to determine whether the CCU is within that zone become unavailable, the zone moves into its 'out of zone' state. If, on the other hand, a zone is sticky, then in the event that the inputs used to determine whether the CCU is within that zone become unavailable, the zone 'sticks' to its last known state. Thus a train losing its GPS signal when it goes into a tunnel does not cause the CCU to leave its current country as described by a 'sticky' geographic zone. Each zone's stickiness value may be configured with a time limit, defaulting, for example, to 1 hour, after which time the each zone returns to its default state. As an example in which a zone's stickiness default time period may be altered, if it is known that a train remains in a shed for 6 hours at night with no GPS signal, then a stickiness value of a 6 hours while in an 'in_shed' zone may be appropriate.

The stickiness attribute can, in particular circumstances, result in 'latch up' situations which are non-recoverable. In particular, it is conceivable that a zone turns off the input which made the zone active, while a stickiness ensures that the input is never turned on again in order to re-evaluate the state of the zone. By defining time limits for the stickiness of each sticky zone, it can be ensured that the inputs for a zone are re-evaluated.

Embodiments of the present invention have been described above and it will be appreciated that the embodiments described are in no way limiting. Indeed, many variations to the described embodiments will be apparent to an ordinary skilled person, and such variations are within the spirit and the scope of the present invention.

The invention claimed is:

1. A method of providing connectivity to a vehicle, comprising at a first device aboard the vehicle:
   establishing at least one first connection with at least one first network, said at least one first connection allowing communication with a second device not aboard the vehicle and remote from said first device;
   transmitting via said at least one first connection an allocation request to said second device;
   receiving via said at least one first connection an allocation response from said second device, said allocation response indicating a first authentication device from a plurality of authentication devices not aboard the vehicle and remote from said first device, wherein said allocation response further indicates a third authentication device of said plurality of authentication devices;
   establishing a second connection with a second network and authenticating said first device on the second network using said first authentication device, the establishing a second connection comprising switching between a first state in which a first modem of said first device uses an authentication device co-located with the first device to a second state in which said first modem uses said first authentication device, wherein in said second state a second modem of said first device uses a second authentication device co-located with the first device, the authenticating said first device on the network comprising transmitting authentication data between said first device and said first authentication device via said at least one first connection; and establishing a third connection with a third network and authenticating said first device on said third network using said third authentication device, wherein establishing the third connection comprises switching to a third state in which said second modem uses said third authentication device.

2. The method of claim 1, wherein establishing a second connection with a network and authenticating said first device on the network comprises:
    transmitting a connection request to a fourth device on said second network;
    receiving in response to said connection request a first authentication token;
    transmitting said first authentication token to said first authentication device;
    receiving a second authentication token from said first authentication device; and
    transmitting said second authentication token to said fourth device.

3. The method of claim 1, further comprising selecting one of a plurality of networks;
    wherein said allocation request comprises an indication of said selected one of said plurality of networks; and
    said first authentication device is associated with said selected one of said plurality of networks.

4. The method of claim 3, wherein said selection of one of said plurality of second networks is based upon respective signal strengths of said plurality of networks.

5. The method of claim 2, wherein said second authentication token comprises a result of signing said first authentication token with a key maintained by the first authentication device.

6. The method of claim 1, wherein said first authentication device is a subscriber identity module (SIM).

7. The method of claim 1, wherein at least one of said first network or said second network is a GSM network.

8. The method of claim 1, wherein said first connection is established using a second authentication device co-located with said first device.

9. The method of claim 8, wherein establishing said first connection comprises selecting said second authentication device from a plurality of authentication devices co-located with said first device.

10. The method of claim 1, further comprising determining a geographical location;
    wherein said allocation request comprises an indication of said determined geographical location.

11. The method of claim 10, wherein said first authentication device is associated with said geographical location.

12. The method of claim 1, wherein said allocation response indicates a third authentication device of said plurality of authentication devices remote to said first device; and wherein the method further comprises establishing a third connection with a third network and authenticating said first device on said third network using said third authentication device.

13. The method of claim 1, wherein said allocation response comprises a lease time and the method further comprises:
    transmitting a renewal request to said second device before the expiry of said lease time.

14. An apparatus for providing connectivity to a vehicle, comprising a first device aboard the vehicle, the first device being arranged to:
    establish at least one first connection with at least one network, said at least one first connection allowing communication with a second device not aboard the vehicle and remote from said first device;
    transmit via said at least one first connection an allocation request to said second device;
    receive via said at least one first connection an allocation response from said second device, said allocation response indicating a first authentication device from a plurality of authentication devices remote from said first device and not aboard the vehicle, wherein said allocation response further indicates a third authentication device of said plurality of authentication devices;
    establish a second connection with a second network by switching between a first state in which a first modem of said first device uses an authentication device co-located with the first device to a second state in which said first modem uses said first authentication device, wherein in said second state a second modem of said first device uses a second authentication device co-located with the first device, and authenticating said first device on the second network using said first authentication device by transmitting authentication data between said first device and said first authentication device via said at least one first connection; and
    establish a third connection with a third network by switching to a third state in which said second modem uses said third authentication device, and authenticate said first device on said third network using said third authentication device.

15. A non-transitory computer readable medium carrying a computer program comprising computer readable instructions configured to cause a processor of a first device aboard a vehicle to carry out a method of providing connectivity to the vehicle, comprising:
    establishing at least one first connection with at least one first network, said at least one first connection allowing communication with a second device not aboard the vehicle and remote from said first device;
    transmitting via said at least one first connection an allocation request to said second device;
    receiving via said at least one first connection an allocation response from said second device, said allocation response indicating a first authentication device from a plurality of authentication devices remote from said first device and not aboard the vehicle, wherein said allocation response further indicates a third authentication device of said plurality of authentication devices;
    establishing a second connection with a second network and authenticating said first device on the second network using said first authentication device, the establishing a second connection comprising switching between a first state in which a first modem of said first device uses an authentication device co-located with the first device to a second state in which said first modem uses said first authentication device, wherein in said second state a second modem of said first device uses a second authentication device co-located with the first device, the authenticating said first device on the network comprising transmitting authentication data between said first device and said first authentication device via said at least one first connection; and establishing a third connection with a third network and authenticating said first device on said third network using said third authentication device, wherein establishing the third connection comprises switching to a third state in which said second modem uses said third authentication device.

16. A computer apparatus aboard a vehicle for providing connectivity to the vehicle, comprising:

a memory storing processor readable instructions; and a processor arranged to read and execute instructions stored in said memory; wherein said processor readable instructions comprise instructions arranged to control the computer apparatus to carry out a method of providing connectivity to the vehicle, comprising:

establishing at least one first connection with at least one first network, said at least one first connection allowing communication with a second device not aboard the vehicle and remote from the computer apparatus;

transmitting via said at least one first connection an allocation request to said second device;

receiving via said at least one first connection an allocation response from said second device, said allocation response indicating a first authentication device from a plurality of authentication devices remote from the computer apparatus and not aboard the vehicle, wherein said allocation response further indicates a third authentication device of said plurality of authentication devices;

establishing a second connection with a second network and authenticating said computer apparatus on the second network using said first authentication device, the establishing a second connection comprising switching between a first state in which a first modem of said first device uses an authentication device co-located with the first device to a second state in which said first modem uses said first authentication device, wherein in said second state a second modem of said first device uses a second authentication device co-located with the first device, the authenticating said computer apparatus on the network comprising transmitting authentication data between said computer apparatus and said first authentication device via said at least one first connection; and establishing a third connection with a third network and authenticating said first device on said third network using said third authentication device, wherein establishing the third connection comprises switching to a third state in which said second modem uses said third authentication device.

* * * * *